United States Patent [19]
Schneider

[11] Patent Number: 5,893,159
[45] Date of Patent: Apr. 6, 1999

[54] METHODS AND APPARATUS FOR MANAGING SCRATCHPAD MEMORY IN A MULTIPROCESSOR DATA PROCESSING SYSTEM

[75] Inventor: Bengt-Olaf Schneider, Yorktown Heights, N.Y.

[73] Assignee: International Business Machines Corporation, Armonk, N.Y.

[21] Appl. No.: 955,551

[22] Filed: Oct. 22, 1997

[51] Int. Cl.⁶ ........................................... G06F 12/00
[52] U.S. Cl. ..................... 711/150; 711/143; 711/147
[58] Field of Search ................... 395/460, 486, 395/739, 480, 461, 674, 678, 569, 200.31–200.35, 200.38–200.48; 711/133, 134, 143–151

[56] References Cited

U.S. PATENT DOCUMENTS

| | | | |
|---|---|---|---|
| 4,740,893 | 4/1988 | Buchholz et al. | 364/200 |
| 4,926,322 | 5/1990 | Stimac et al. | 395/500 |
| 5,008,812 | 4/1991 | Bhandarkar et al. | 364/200 |
| 5,050,098 | 9/1991 | Brown, III et al. | 395/112 |
| 5,159,678 | 10/1992 | Wengelski et al. | 711/153 |
| 5,361,337 | 11/1994 | Okin | 395/375 |
| 5,428,779 | 6/1995 | Allegrucci et al. | 395/650 |
| 5,490,272 | 2/1996 | Mathis et al. | 395/650 |
| 5,493,668 | 2/1996 | Elko et al. | 395/457 |
| 5,553,305 | 9/1996 | Gregor et al. | 395/826 |
| 5,581,743 | 12/1996 | Burton et al. | 395/500 |
| 5,692,149 | 11/1997 | Lee | 711/133 |
| 5,727,178 | 3/1998 | Pletcher | 1/1 |

*Primary Examiner*—Robert B. Harrell
*Assistant Examiner*—David M. Ovedovitz
*Attorney, Agent, or Firm*—Perman & Green, LLP

[57] ABSTRACT

A method is disclosed for operating a software-managed cache memory (30), and includes steps of: (a) registering with an operating system (12A), for at least one thread of a plurality of threads, a memory allocation function; in response to the execution of a first thread being halted, (b) determining if a next thread to be executed has registered a request to be allocated all or a portion of the memory; and (c) swapping-out the memory allocated to the first thread if the first thread has previously registered a memory callback function and if the next thread has made a request to be allocated an amount of memory that exceeds an amount that is not already allocated. If the first thread has not previously registered a memory callback function, or if the next thread has made a request to be allocated an amount of memory that exceeds an amount that is available to be allocated, the method instead allocates a portion of the memory to the second thread that does not overlap a portion already allocated to the first thread, and does not swap-out the portion of the memory that is allocated to the first thread.

22 Claims, 3 Drawing Sheets

METHODS AND APPARATUS FOR MANAGING SCRATCHPAD MEMORY IN A MULTIPROCESSOR DATA PROCESSING SYSTEM

FIELD OF THE INVENTION:

This invention relates generally to multiprocessor systems and, in particular, to those systems that use a high speed dual ported memory for communication between a first data processor and a second data processor.

BACKGROUND OF THE INVENTION:

It is well known in the art to provide a general purpose processor that is coupled to a special purpose processor through a dual ported read/write (R/W) memory. During the operation of such a system the general purpose processor loads the memory with data to be operated on by the special purpose processor, which then operates on the data independently of the special purpose processor. When the special purpose processor finishes, the general purpose processor is enabled to retrieve the processed data from the memory. The memory may be referred to as a scratchpad memory, and the special purpose processor may be optimized for performing vector operations, matrix operations, or any other processing task that would not be efficiently performed by the general purpose processor.

In some such systems the general purpose processor may be responsible for executing a plurality of tasks or threads in a time multiplexed or other fashion, which gives the external appearance that a plurality of such threads are being executed concurrently. In this case both the general purpose processor and the special purpose processor must be capable of switching between the execution of various tasks or threads. This implies that the scratchpad memory should be managed in such a manner that the switching between tasks or threads occurs in efficient manner.

In conventional systems it is often the case that when the special purpose processor is required to switch from executing one thread to executing another thread (typically referred to as a context switch), the complete processing state of the special purpose processor must be saved. This includes the register state of the special purpose processor, as well as data stored in the scratchpad memory. While registers in the special purpose processor may be saved in a relatively short period of time, it may require an appreciable amount of time to save or swap-out the content of the scratchpad memory. A like amount of time may then be required to subsequently restore or swap-in the content of the scratchpad memory when the previously operating thread is restarted.

While in some situations it is essential that the scratchpad memory be swapped-out during a context switch, the inventor has realized that in other situations it is not essential or required. However, in conventional system the memory swapping-out operation is still performed, leading to inefficiencies in the operation of the system.

U.S. Pat. No. 5,008,812 to Bhandarkar et al. describes a method for saving the state information of a vector processor only if a new process attempts to execute a vector instruction, i.e., is about to change the current state of the vector processor. However, this patent does not suggest the application of this technique to resources other than the vector processor registers.

U.S. Pat. No. 5,428,779 to Allegrucci et al. describes a method for saving and restoring the context (state) of processors in a multi-processor system by storing code snippets that save the state to memory and restore it from memory.

U.S. Pat. No. 4,740,893 to Buchholz et al. describes the use of flags to indicate whether vector registers in a vector processor are either all zero or have changed since the last restore operation for a given vector register. The use of such 'dirty bits' is said to reduce the time required to store data.

U.S. Pat. No. 5,361,337 to Okin describes the use of shadow registers in a processor to quickly switch to another process if the active process encounters a cache miss. The process switch is accomplished by selecting another register set amongst the shadow registers.

U.S. Pat. No. 5,490,272 to Mathis et al. describes a method for subdividing a time-slice allocated to a thread into finer units, so called threadlets, that can be scheduled within a time-slice. Transition between threadlets occurs at points in the application where no state needs to be saved or restored. Such points are identified in the application by special instructions.

U.S. Pat. No. 5,493,668 to Elko et al. describes a mechanism to ensure data coherency between data stored in primary memory, e.g., a cache, and secondary memory. Data is shared between processors in a multiprocessor system and each processor can change the shared data. The patent describes changes to data are preserved if those changes occur during a write-back operation to disk.

U.S. Pat. No. 5,553,305 to Gregor et al. describes the scheduling and synchronization of threads by tracking whether data are available that are required for executing a thread. The particular technique described by the patent places a thread identification into memory location where the data is expected to be found. Once the data are retrieved, the thread identification is replaced and the thread is entered into a scheduling queue.

OBJECTS AND ADVANTAGES OF THE INVENTION:

It is a first object and advantage of this invention to provide an improved multiprocessor system that efficiently manages the use of a scratchpad memory between two data processing entities, such as a general purpose processor and a special purpose processor.

It is a further object and advantage of this invention to provide a method to realize operating system support of a software-managed cache memory, in particular scratchpad memory.

It is a further object and advantage of this invention to provide for an efficient sharing of the scratchpad memory 30 between several processes and threads.

It is another object and advantage of this invention to provide for a reduction of save/restore operations for a scratchpad memory by sharing the use of the scratchpad memory, when possible, between different threads.

It is another object and advantage of this invention to provide a technique to defer a scratchpad memory save operation until an active thread requests an allocation of scratchpad memory that is occupied by an inactive thread.

It is one further object and advantage of this invention to provide a technique to defer save/restore operations by the use of callback routines, for each thread, that are pre-registered with the operating system.

SUMMARY OF THE INVENTION

The foregoing and other problems are overcome and the objects of the invention are realized by methods and apparatus in accordance with embodiments of this invention.

A method is disclosed for operating a software-managed cache memory, and includes steps of: (a) requesting from an operating system, for at least one thread of a plurality of threads, a memory allocation; in response to the execution of a first thread being halted, (b) determining if a next thread to be executed has registered a request to be allocated all or a portion of the memory; and (c) swapping-out the memory allocated to the first thread if the first thread has previously been allocated memory and if the next thread has made a request to be allocated an amount of memory that exceeds an amount that is not already allocated. If the first thread has not previously been allocated memory, or if the next thread has made a request to be allocated an amount of memory that exceeds an amount that is available to be allocated, the method instead allocates a portion of the memory to the second thread that does not overlap a portion already allocated to the first thread, and does not swap-out the portion of the memory that is allocated to the first thread.

One of the memory allocation functions in accordance with this invention is a request to allocate a non-swappable amount of memory, and another is a request to allocate a swappable amount of memory. This latter function further includes information specifying at least one of where to save a swapped-out memory portion or from where to restore a swapped-out memory portion. Another one of the memory allocation functions causes the operating system to set a save callback function previously registered for allocated memory. This memory allocation function takes arguments indicating where to save or from where to restore the contents of the memory. More particularly, a SPcallbacks ( ) function in accordance with this invention provides a mechanism to change save/restore callbacks.

The method further includes a step of returning information to a thread from the operating system, the returned information indicating in one case an amount of memory allocated to the thread and a starting address of the allocated memory, and in another case a total size of the memory, a size of a line in the memory, a minimum number of lines that can be allocated, and a maximum number of lines that can be allocated as being unswappable.

In one aspect the method further includes a step of sending a request from the thread to the operating system for deallocating the allocated memory starting at the address of the allocated memory.

In a presently preferred embodiment of this invention at least one of the first and second threads are executed in a special purpose processor that is coupled to a control processor through the memory, the control processor executing the operating system. The special purpose processor may be comprised of a vector processor, and the control processor may be comprised of a scalar processor and may be implemented as a reduced instruction set computer (RISC) processor.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
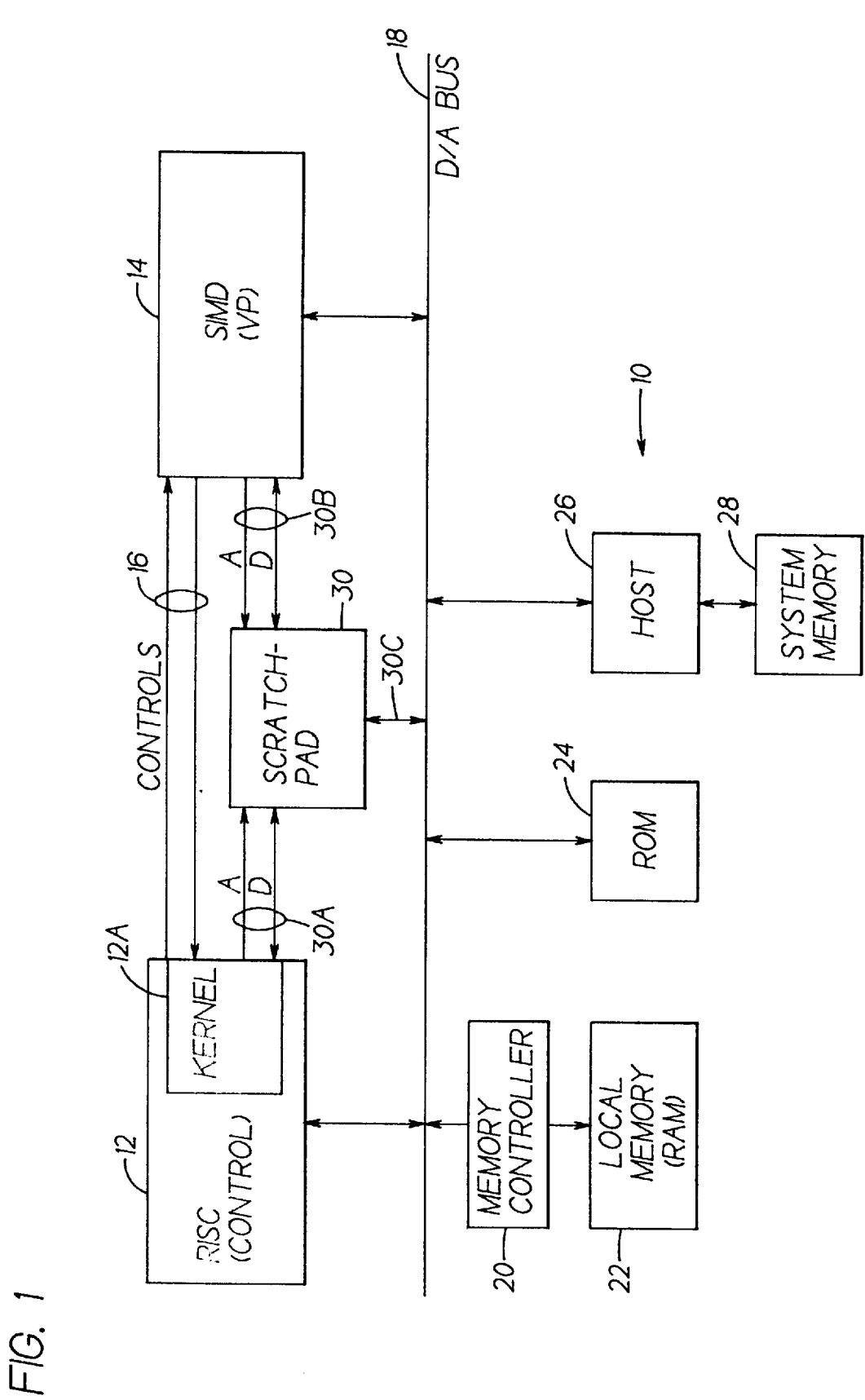
FIG. 1 is a block diagram of an exemplary multiprocessor data processing system that is constructed and operated in accordance with this invention, the system comprising a scalar control processor and a slaved vector processor that communicate data through a dual ported random access memory, referred to here in as a scratchpad memory.

Referring to FIG. 1, a data processing system 10 includes a control processor (CP) 12 and a slave processor 14. In a preferred embodiment, the CP 12 is a reduced instruction set computer (RISC) that runs an operating system (OS) having a kernel 12A. The kernel 12A is considered for the purposes of this description to be a portion of the operating system that operates to execute the scratchpad memory management functions described in detail below. The CP 12 may be 32-bit, integer (scalar) processor capable of executing a plurality of tasks or threads. Also in the preferred embodiment the slave processor 14 is a single instruction, multiple data stream (SIMD) vector processor (VP) that is slaved to the control processor 12 and that also executes threads. The teachings of this invention are not, however, limited only to these processor types.

A set of control signal lines comprise a control path 16 that is connected between the control processor 12 and the VP 14. The CP 12 and VP 14 are also bidirectionally connected to a data/address (D/A) bus 18. Also connected to the D/A bus 18 is a memory controller 20 that is further connected to a local R/W memory 22 and a read only memory (ROM) 24. The local memory 22 may be implemented with synchronous dynamic RAM, or SDRAM, devices. The ROM 24 stores bootup routines, and may be used to also store frequently used routines that are desired to be executed in a rapid manner. A host processor 26, such as a high performance microprocessor system, having a system memory 28, such as a large capacity DRAM, is also coupled to the D/A bus 18.

In the preferred embodiment of this invention a high speed, dual port data memory, referred to as a scratchpad (SP) memory 30, couples the CP 12 to the VP 14 through address (A) and bidirectional data (D) paths 30A and 30B.

Figure 2:
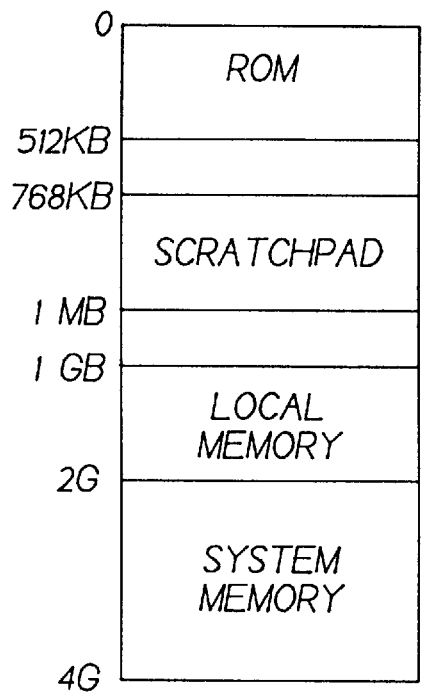
FIG. 2 is an exemplary address map for the data processing system of FIG. 1.

FIG. 2 is an exemplary address map of the system 10 shown in FIG. 1, wherein it can be seen that the scratchpad memory 30 occupies the region from 768 KBytes to 1 MByte.

Figure 3:
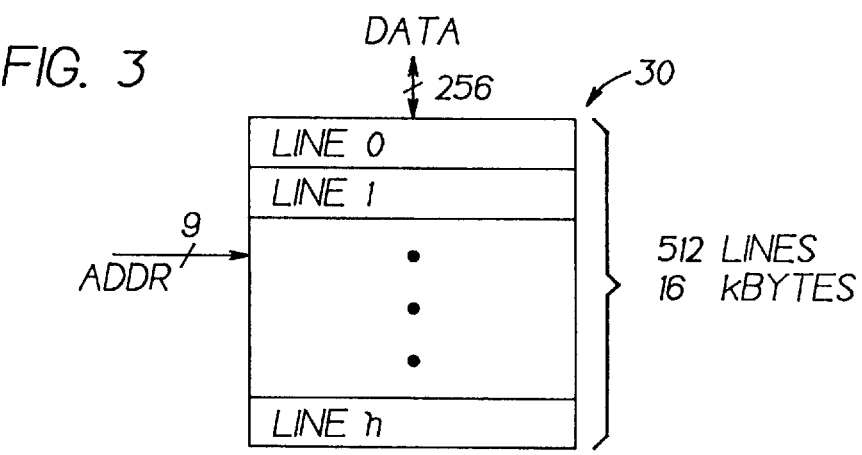
FIG. 3 illustrates the organization of the scratchpad memory shown in FIG. 1.

FIG. 3 illustrates the organization of the scratchpad memory 30, and shows that each input address (A) path is nine bits in width, and that the bidirectional data (D) path is 256 bits (32 Bytes) in width. The scratchpad memory 30 is organized as n lines, such as 512 lines, each comprising, for example, 32 Bytes, for a total of 16 KBytes. As such, a line at a time can be stored into or read from the scratchpad memory 30.

The address map and particular scratchpad 30 organization shown in FIGS. 2 and 3 are exemplary of one embodiment of the invention, and a number of other organizations, memory sizes, line widths, etc., could be used. As such, the illustrated embodiment is not intended to be read as a limitation upon the practice of this invention.

At least some of the threads executed by the CP 12 will typically require vector addition or other types of processing that are most efficiently performed on the VP 14. For these cases the kernel 12A is responsible for insuring that memory is allocated for the scratchpad that will be used during the operation of the VP 14. It should be noted that the VP 14 will load/store or prefetch data between the local memory 22 and the scratchpad 30. The kernel 12A is also responsible for synchronizing the operation of the VP 14 to the CP 12 using the control path 16. Data that has been processed by the VP 14 is loaded into the scratchpad 30 via the A/D path 30B, and is subsequently extracted from the scratchpad 30. The scratchpad 30 may be considered to operate as a high speed, software managed cache memory.

Threads may be swapped-in and swapped-out by the kernel 12A based on different criteria. For example, if a particular thread that is operating requires a result from another thread before if can continue execution, the thread can be temporarily halted and removed (swapped-out of the CP 12 and VP 14 and its state saved) and another thread swapped-in. A particular CP 12 thread that has a thread running in the VP 14 is considered to have locked the VP 14, that is, it temporarily owns the VP 14 resource (and at least a portion of the scratchpad memory 30). As was indicated above, the swapping-out of one thread and the swapping-in of another thread can be referred to as a 'context switch'.

Due to the required synchronization between the operations of the CP 12 and the VP 14, it can be appreciated that the management and control of the scratchpad memory 30 is an important aspect of the overall performance of the system 10. The teachings of this invention are thus directed towards enhancing the management and control of the scratchpad memory 30.

The following description provides a mechanism to manage the scratchpad memory 30 to allow several VP 14 threads to own or be allocated a portion of the scratchpad memory 30. One goal of this mechanism is to reduce the number of save and restore operations for data held in scratchpad memory 30.

The ensuing description will first treat the control mechanism and a programming interface, followed by examples of how the programming interface may be used to implement application programs. In the following discussion the word 'scratchpad' may be abbreviated as 'SP'.

There are special instructions VPFTCHSP and VWBACKSP to issue non-blocking memory-memory operations for transferring data between the scratchpad 30 and the local memory 22. Regular load/store instructions transfer data between registers in the CP 12 or VP 14 and the scratchpad memory 30. The implementation of the scratchpad memory 30 guarantees that loads from scratchpad memory 30 will stall until a pending prefetch to that location has completed. This is achieved by maintaining a valid (V) bit for every line in scratchpad memory 30. The scratchpad memory 30 is not cached by any of the subsystems of the system 10, in particular scratchpad memory 30 locations are not cached in the CP 12's data cache. Load and store operations to the scratchpad memory 30 require two cycles if the accesses don't straddle line boundaries, otherwise load and store operations require four cycles.

The kernel 12A provides services to allocate and deallocate a region in the scratchpad memory 30 to a thread. The scratchpad memory 30 is a resource shared by all threads running on the VP 14. It should be noted that the scratchpad memory 30 cannot be accessed by a particular CP 12 thread that did not first lock the VP 14. Locking the VP 14 occurs when a particular thread running on the CP 12 starts a thread running on the VP 12. However, it is not desirable to fully virtualize the scratchpad memory 30, due to the large processing overhead involved in fully saving and restoring the contents of the scratchpad memory 30.

In accordance with an aspect of this invention the kernel 12A supports a collaborative sharing of the scratchpad memory 30. Several VP 14 threads, that each only require a portion of the scratchpad memory 30, can coexist in the scratchpad memory 30. Furthermore, when a thread is swapped-out by the kernel 12A, the thread is not required to clean up the scratchpad memory 30 immediately. Instead, it registers callback functions with the kernel 12A for saving and restoring the relevant scratchpad memory 30 contents on demand. This solution avoids frequent transfers of scratchpad memory 30 contents, especially for the case where there is a sufficient number of scratchpad memory 30 locations available to hold the data of all threads using the scratchpad memory 30.

As employed herein a callback function is one that is defined in user code and used by a thread called by the kernel 12A (i.e., a "call back" from the kernel). The term "registering" is used to describe a process whereby a thread informs the kernel 12A of the name (i.e., entry point) of the callback functions.

The kernel 12A can withdraw allocated scratchpad memory 30 memory from a thread, but only from those threads that are swapped-out and that have not locked the VP 14. If the kernel 12A withdraws scratchpad memory 30 from a thread it uses a save callback function to save the scratchpad memory 30 contents in the local memory 22, and a restore callback function to restore the scratchpad memory 30 contents from the local memory 22 when the thread is swapped-in.

The use of the callback functions indicates to a real time operating system (RTOS), of which the kernel 12A forms a part, whether or not the scratchpad memory 30 contents must be saved/restored for context switches. For example, a particular thread may actually use the scratchpad memory 30 only when a VP 14 task is running. While that VP 12 task is running the scratchpad memory 30 is never deallocated by the kernel 12A. However, the scratchpad memory 30 may be deallocated when the VP 14 task has finished, or has been suspended after reaching a 'cleanpoint', that is, a point in the VP 12 processing where it is not necessary to save any state information (e.g., VP 12 registers, flags, etc.). At a cleanpoint the scratchpad memory 30 may not contain any valid information, and can be safely deallocated without first saving the data.

At a 'syncpoint' the amount of state information is typically minimal, and temporary scratchpad memory 30 resources are no longer needed.

The following routines, which may be referred to by programmers as library routines, are provided in accordance with this invention to facilitate the management and the operation of the scratchpad memory 30. These library routines are used by programmers when programming operations that run on the VP 12, and are recognized and operated on by the kernel 12A.

SPalloc (scratchpad allocate)
   void *SPalloc (UINT size, SAVECB *scb, RESTORECB
     *rcb);
where *scb and *rcb are pointers to functions that are called by the kernel 12A is a callback is required.

The kernel 12A responds to this function by allocating 'size' bytes in scratchpad memory 30 to a calling thread. If 'size' is not an integer multiple of the scratchpad memory 30 line size, the smallest number of lines containing at least 'size' bytes are allocated. The parameters 'scb' (for save callback (SAVECB)) and 'rcb' (for restore callback (RESTORECB)) are used to register callback functions with the kernel 12A for saving and restoring the scratchpad memory 30 contents. If NULL is passed for 'scb', no save callback is registered. If 'scb' is set to NULL, the value of 'rcb' is ignored, and default save and restore callback functions are used.

The return value of this function is NULL if the requested scratchpad memory 30 cannot be allocated by the kernel 12A to the calling thread, otherwise the starting address of the allocated scratchpad memory region is returned. The call to SPalloc( ) is preferably uninterruptible.

SPallocfixed void *SPallocfixed (UINT size);

In response to this function call the kernel 12A allocates 'size' bytes in scratchpad memory 30 to the calling thread. The allocated scratchpad memory 30 storage is not swapped-out by the kernel 12A. If 'size' is not an integer multiple of the scratchpad memory 30 line size, the smallest number of lines containing at least 'size' bytes are allocated.

The return value is NULL if the requested amount of scratchpad memory 30 cannot be allocated, otherwise the starting address of the allocated region is returned.

This function call may fail for several reasons. First, the requested amount of memory may exceed the size of the scratchpad memory 30. Second, the requested amount of memory may exceed the available swappable memory in the scratchpad memory 30. Third, the requested amount of memory (possibly together with already allocated unswappable scratchpad memory 30) may exceed the maximum amount of scratchpad memory 30 that can be allocated as unswappable. This maximum amount is preconfigured in the kernel 12A and can be queried with another library function SPinfo( ), as described below.

The call to SPallocfixed ( ) is preferably uninterruptible.

SPallocated

UINT SPallocated (void *mem);

In response to this function the kernel 12A returns the actual amount of memory, in bytes, that is allocated for the scratchpad memory 30 area starting at 'mem'. The return value is undefined if 'mem' is not the start of an allocated area of memory in scratchpad memory 30. Applications are free to use the actual allocation even if they have requested less memory with SPalloc ( ) or SPallocfixed( ). The difference between the requested and the allocated scratchpad memory 30 is due to the fact that the memory is allocated in multiples of scratchpad memory 30 lines, and to the fact that the kernel 12A maintains a minimum allocation size. This minimum can be queried with the SPinfo( ), as described below.

SPfree void SPfree (void *mem);

In response to this function the kernel 12A deallocates, starting at 'mem', the previously allocated scratchpad memory 30. The call to SPfree( ) is preferably uninterruptible.

SPcallbacks

```
void SPcallbacks (void *mem, SAVECB *scb, void *suser,
                                  RESTORECB *rcb, void
                                  *ruser);
typedef void (void *mem, void *dst, void *user)
                  SAVECB;
typedef void (void *mem, void *src, void *user)
                  RESTORECB;
```

In response to this function the kernel 12A sets the save callback function previously registered for the scratchpad memory 30 memory allocated at 'mem'. The save and restore callback functions take arguments indicating where to save (*dst) or from where to restore (*src) the contents of the scratchpad memory 30. The argument 'user' can be used by the application to pass application-specific data into the save/restore callback function. It is the responsibility of the application that all important data are moved, and that the save and restore functions are matched in their effect. The call to SPcallbacks( ) is preferably uninterruptible.

SPinfo

```
void SPinfo (SPinfo_t *info);
typedef struct {
    UINT size;           //Size of entire scratchpad
                         memory 30 in bytes
    UINT linesize;       //Number bytes in a
                         scratchpad memory 30 line
    UINT minalloc;       //Min number of lines that
                         can be allocated
    UINT maxfixed;       //Max number of lines that
                         can be allocated as
                         unswappable
} SPinfo_t;
```

In response to this function call the kernel 12A returns information to the calling thread about the scratchpad memory 30 configuration. The values of 'size' and 'linesize' are hardware specific. The values of 'minalloc' and 'maxfixed' are set by the kernel 12A.

Based on the foregoing description is can be appreciated that this invention provides: (a) a method to realize operating system support of a software-managed cache memory, in particular the scratchpad memory 30; (b) provides for an efficient sharing of the scratchpad memory 30 between several processes and threads; (c) beneficially provides for a reduction of save/restore operations for the scratchpad memory 30 by sharing the scratchpad memory, when possible, between different threads; (d) provides a technique to defer a scratchpad memory save operation until an active thread requests scratchpad memory occupied by an inactive thread; and (e) furthermore provides a technique to defer save/restore operations by the use of callback routines, for each thread, that are pre-registered with the operating system.

Based on the foregoing description it may be further realized that the scratchpad memory 30 management functions are related to a number of system-level issues, including the nature of the coupling of the VP 14 and scratchpad memory 30, scratchpad memory fragmentation, the accounting for callback routines, the cycle count of callback routines, and the overall efficiency of callbacks. These issues are treated in turn below.

Coupling of the VP 14 and Scratchpad Memory 30

It is preferred to tightly couple the VP 14 and the scratchpad memory 30 to simplify scheduling the save/restores for the scratchpad memory 30 data. Saves and restores only occur as a consequence of swapping-in and swapping-out of VP 14 threads (at clean/sync/exit points). As a consequence, a CP 12 thread can access the scratchpad memory 30 only if it also controls the VP 14, and any CP 12 accesses to scratchpad memory 30, without having first locked the VP 14, result in an exception being generated. This restriction thus does not allow CP 12 threads to independently access the scratchpad memory 30, for instance to prepare a data buffer before calling the VP 14.

Scratchpad Memory 30 Fragmentation

Those skilled in the art will realize that repeated allocation and deallocation of small portions of the scratchpad memory 30 may result in the scratchpad memory 30 entering a fragmented state. In that running applications are not notified that their scratchpad memory 30 segment has been relocated, in the preferred embodiment of the invention a dynamic defragmentation of the scratchpad memory 30 is not performed.

However, it is within the scope of this invention to perform dynamic defragmentation in accordance with the following technique.

First, all calls return and accept a handle (e.g., void *mem, UINT *handle (pointer to unsigned integer)). A further call is defined as SPphysicalAddr (handle), which returns the actual start address:void *SPphysicalAddr(UINT handle). Before working with the allocated memory the application retrieves the physical start address and stores it into an index or base register. All subsequent references into memory are then made relative to this register. The kernel 12A may relocate an allocated memory range if the owning thread is inactive. Upon activation of a thread, the restore callback routine is called. The restore callback routine retrieves the current actual addresses of all allocated memory areas by calling SPphysicalAddr( ) and then stores the returned addresses into the appropriate index registers.

This ability to relocate the memory of inactive threads through dynamic defragmentation allows the kernel 12A to compact the allocated memory in the scratchpad memory 30, thereby potentially enabling the kernel 12A to keep the memory of more threads resident in the scratchpad memory 30.

In order to reduce the amount of fragmentation of the scratchpad memory 30, it is preferred that the scratchpad memory 30 be allocated in units of 1 KByte blocks, which can be enforced by requiring the kernel 12A to always allocate some minimum number of 32 Byte lines (i.e., always allocate at least 32 lines). The value of the minimum number of lines that can be allocated by the kernel 12A can be queried with the SPinfo( ) function.

Accounting For Callback Cycles

Proper scheduling of a thread requires that the scheduler can accurately account for the processing cycles that are required to be expended on behalf of that thread. However, the delayed execution of the callback functions, in accordance with this invention, may complicate the accounting process. One method to avoid this complication is to create a separate thread that only executes the callbacks, i.e., a Callback Thread. The Callback Thread is scheduled like any other thread when a callback function must be executed.

Cycle Count of Callback Routines

The actions performed during the swap-in of a thread should preferably execute in a minimum number of cycles. However, if the swap-in of a thread is performed with an interrupt service routine, more than a desired number of cycles may be required. It is thus desirable to perform the callback operation outside of the interrupt service routine in a separate thread that is called before the thread is activated.

Efficiency of Callbacks

Saving and restoring of VP 14 state and scratchpad memory 30 data at clean points and sync points is performed using VP 14 instructions (e.g., VPFTCHSP and VWBACKSP) for store and write back. These instructions can move, for example, 32 bytes at a time and are therefore of reasonable efficiency. However, implementing the save/restore functions using the callbacks in accordance with this invention requires that the CP 12 perform the write back of data in the scratchpad memory 30. However, the CP 12 may not support 32 byte transfers, for example the CP 12 may support only four byte transfers, which would result in the save/restore routines requiring a significantly longer period to execute.

It is thus preferred to implement special CP 12 instructions that can move 32 bytes of data to and from scratchpad memory 30. These special CP 12 instructions are thus implemented so as to be equivalent in functionality to the VP 14 instructions VPFTCHSP and VWBACKSP used for the same purpose.

EXAMPLES OF THE USE OF THIS INVENTION

The following example illustrates the usage of the scratchpad memory management functions in allocating the scratchpad memory 30. In this example a thread has two sections that use the scratchpad memory 30 to a different degree. Accordingly, the thread changes the callback functions to reflect which data in the scratchpad memory 30 needs to be saved during a context switch. In this and the other examples and text following // is considered as a comment.

```
//
//First set of callback functions, only saves/restores
//the first 20 elements in scratchpad memory 30
//
void scb1 (void *mem, void *dst, void *user)
{memcpy (dst, mem, 20); }
void rcb1 (void *mem, void *src, void *user) )
{memcpy (mem, src, 20); }
//
//Second set of callback functions, save/restores the
//entire scratchpad memory 30 contents
//
void scb2 (void *mem, void *dst, void *user) )
{memcpy (dst, mem, 200) ; }
void rcb2 (void *mem, void *src, void *user) )
{memcpy (mem, src, 200) ; }
//
//Allocate 200 bytes in scratchpad memory 30, for a 32 byte
//line, 224 bytes (7 lines) will be allocated.
//
while ((sp = SPalloc (200, scb1, rcb1)) == NULL);
.
. // Some desired computation occurs
.
//
// Change the callback functions
//
SPcallbacks (sp, scb2, NULL, rcb2, NULL) ;
.
. // More desired computation
.
//
// Free the allocated memory
//
SPfree (sp);
```

Every process running on the system 10 can contain several threads of execution. Threads can be either running on the CP 12 or on the VP 14. The scratchpad memory 30 can be used to establish communication between different threads within a process. Other mechanisms also exist for performing inter-thread communication, such as special instructions executed by the CP 12 and send( )/recv( ) services of the real time OS.

Since scratchpad memory 30 locations are non-cached, and accesses into the scratchpad memory 30 are strictly sequential, the scratchpad memory 30 can be used to construct communication primitives such as locks, mutexes, semaphores etc. For example, a location in scratchpad memory 30 can be used to establish a handshaking protocol to control access to a buffer located in local memory 22. The following is one example of such a technique.

```
//
//CP 12 thread
//1. Prepares a buffer
//2. Set the valid flag
//3. Wait for the VP 14 to consume the buffer by observing
// the valid flag
```

-continued

```
//First lock the VP 14 to guarantee access to the
//scratchpad memory 30.
VPlock( );
//Then allocate the semaphore in the scratchpad memory 30.
//Allocation of the scratchpad memory doesn't require
//callbacks, as the semaphore is only needed while the VP
//14 is running, and won't be lost until the VP 14 is
//finished, i.e. unlocked.
while (!(semaphore = SPalloc(1, NULL, NULL, NULL, NULL)));
semaphore = 0;
// Fill the buffer, signal that the buffer is full, and
// then wait for VP 14 to empty the buffer.
while (1)
{ while (semaphore == 1);             // Wait for buffer empty
FillBuffer ( );
FlushBuffer ( );
semaphore = 1;                        // Signal that buffer is full
}
```

A description is now provided of the technique for handling the scratchpad memory 30 when swapping threads. The following outlines the actions of the kernel 12A during the switching of threads on the CP 12 and the VP 14.

```
//
//Swap-out CP 12 thread A and swap-in CP 12 thread B
//
Save CP 12 state of thread A
START thread SP_SVC(B)
WAIT for SP_SVC( ) to complete
Restore CP 12 state of thread B
//
//Swap-out VP 14 thread A and swap-in VP 14 thread B
//
WAIT for thread A to reach cleanpoint or sync point
CALL context save routine of thread A
START thread SP_SVC(B)
WAIT for SP_SVC( ) to complete
CALL context restore routine of thread B
```

The following describes the function of the scratchpad (SP) memory 30 service thread that restores the scratchpad memory 30 contents for thread B and, if necessary, saves the scratchpad memory 30 contents that overlaps with scratchpad memory 30 occupied by thread B.

```
//
//Scratchpad memory 30 service routine to restore SP(B)
//
SP_SVC (THREAD B)
    {  IF (SP(B)was saved)
         ( IF (SP(B) is overlapped by data from other threads)
             FORALL threads t overlapping SP(B) DO
             {    IF (t running)
                    WAIT for t to finish or to swap-out
                  Save SP(t)
             }
       Restore SP(B)
       }
}
```

Figure 4:
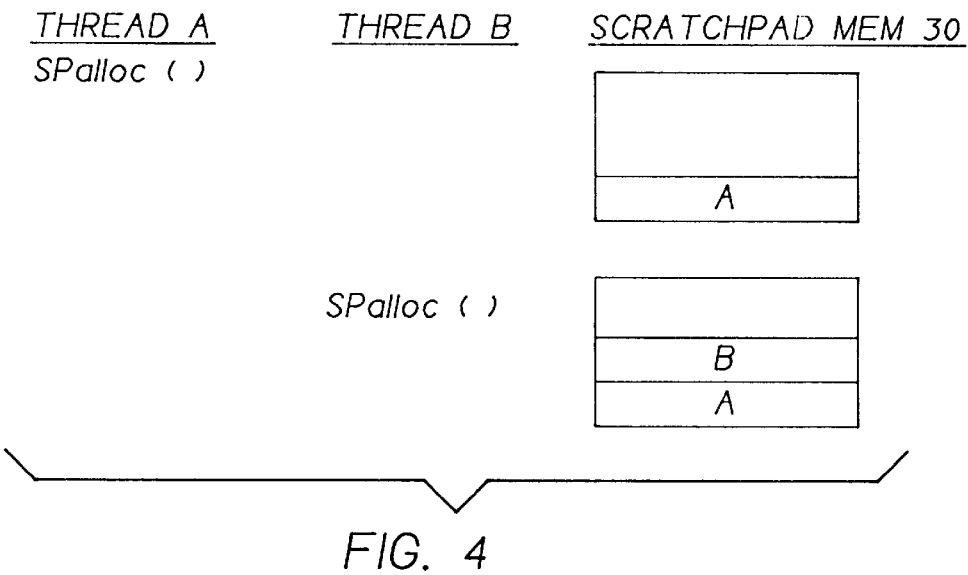
FIG. 4 depicts the utilization of the scratchpad memory by two concurrent processes.

Referring to FIG. 4, there is shown a case where a sum of an amount of scratchpad memory 30 allocated to threads A and B is less than the size of the scratchpad memory 30. In this case the threads A and B can be defined as non-competing threads. The kernel 12A in this case does not automatically swap-out the thread A data from the scratchpad memory 30 when the thread B begins running on the VP 14. This results in a significant processing efficiency being realized, not only by avoiding the requirement to swap-out thread A's data, but later if thread A is again swapped-in, as it is not necessary to first restore thread A's data from local memory 22.

Figure 5:
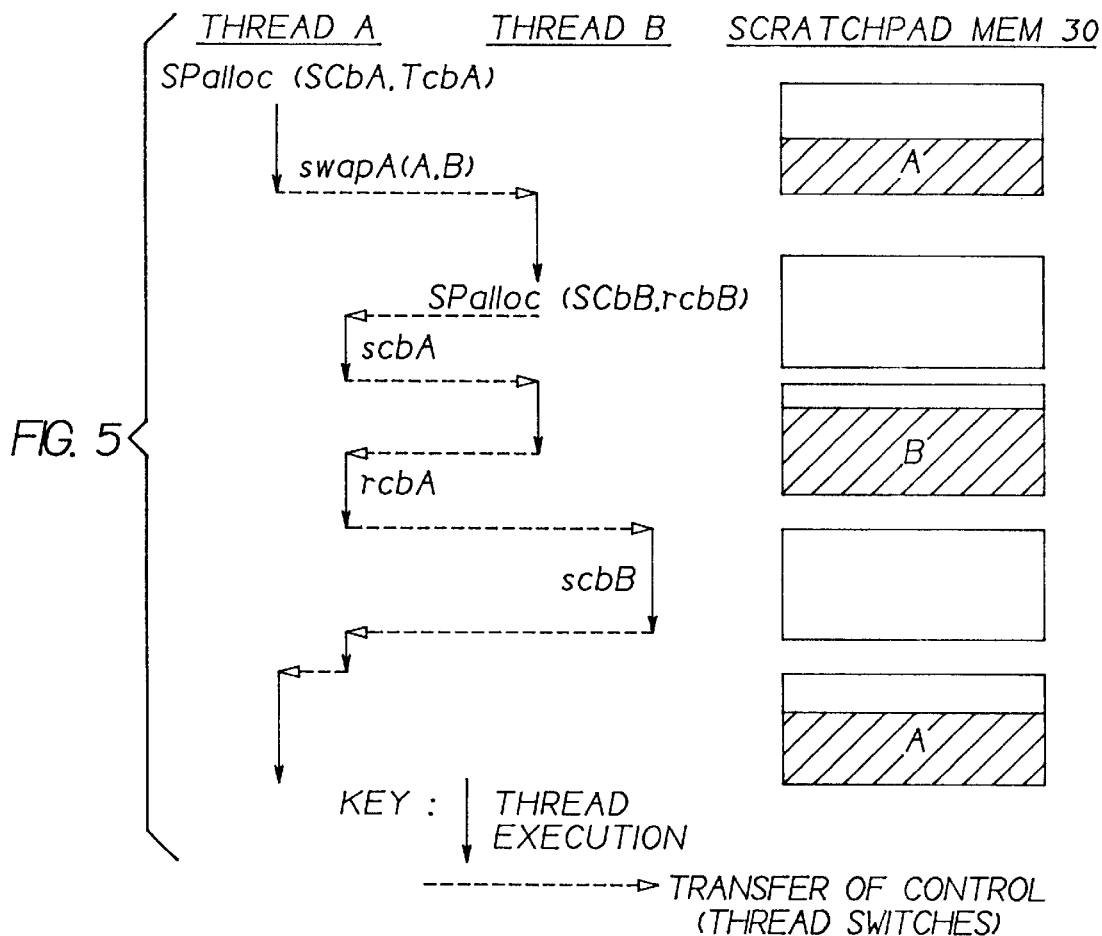
FIG. 5 depicts the utilization of the scratchpad memory by two concurrent and competing processes.

Referring to FIG. 5, there is shown a case where the sum of the amount of scratchpad memory 30 allocated to threads A and B is greater than the size of the scratchpad memory 30. In this case the threads A and B can be defined as competing threads. The kernel 12A in this case performs the scbA operation by saving thread A's data, after thread A is swapped-out, in response to the SPalloc function executed by thread B when thread B is started. It is assumed that the SPalloc function for thread B specified a 'size' that required a number of lines in the scratchpad memory 30 that could not be accommodated due to the presence of the already allocated lines to thread A. When thread B is stopped, the kernel 12A executes the previously registered save for thread B (scbB), in response to the previously registered restore (rcbA) for thread A, which is then restarted.

In either case, in the preferred embodiment of this invention the VP 14 registers are immediately swapped-out when a new thread is swapped-in.

While the invention has been particularly shown and described with respect to preferred embodiments thereof, it will be understood by those skilled in the art that changes in form and details may be made therein without departing from the scope and spirit of the invention.

What is claimed is:

1. A method for operating a software-managed cache memory, comprising steps of:

registering with an operating system, for at least one thread of a plurality of threads, a memory allocation function;

in response to the execution of a first thread being halted, determining if a next thread to be executed has registered a request to be allocated all or a portion of the cache memory; and saving the contents of the cache memory allocated to the first thread to a main memory location if the first thread has previously registered a memory allocation function and if the next thread has made a request to be allocated an amount of memory that exceeds an amount of the cache memory that is available to be allocated, else allocating a portion of the cache memory to the second thread that does not overlap a portion already allocated to the first thread.

2. A method as in claim 1, wherein one of the memory allocation functions is a request to allocate an amount of cache memory that can not be saved to and restored from a main memory location.

3. A method as in claim 1, wherein one of the memory allocation functions is a request to allocate an amount of cache memory that can be saved to and restored from a main memory location, and further includes information specifying at least one of where to save the contents of a saved portion of the cache memory or from where to restore the contents of a saved portion of the cache memory from the main memory location.

4. A method as in claim 1, wherein one of the memory allocation functions causes the operating system to set a save callback function previously registered for allocated memory, this one of the memory allocation functions taking arguments indicating where to save or from where to restore the contents of the cache memory.

5. A method as in claim 1, and further comprising a step of returning information to a thread from the operating system, the returned information indicating an amount of cache memory allocated to the thread and a starting address of the allocated cache memory.

6. A method as in claim 5, and further comprising a step of sending a request from the thread to the operating system for de-allocating the allocated cache memory starting at the address of the allocated cache memory.

7. A method as in claim 1, and further comprising a step of returning information to a thread from the operating system, the returned information indicating a total size of the cache memory, a size of a line in the cache memory, a minimum number of lines that can be allocated in the cache memory, and a maximum number of lines that can be allocated in the cache memory that can not be saved to and restored from a main memory location.

8. A method as in claim 1, and further comprising a step of performing dynamic defragmentation of the cache memory.

9. A method as in claim 1, wherein at least one of the first and second threads are executed in a special purpose processor that is coupled to a control processor through the cache memory, the control processor executing the operating system.

10. A method as in claim 9, wherein the special purpose processor is comprised of a vector processor, and wherein the control processor is comprised of a scalar processor.

11. A method as in claim 9, wherein the control processor is comprised of a RISC processor.

12. A data processing system comprising a control processor coupled to a special purpose processor through a scratchpad memory, said system comprising an operating system kernel executed by said control processor for providing, to at least one thread of a plurality of threads, a scratchpad memory allocation function; said kernel being responsive to the execution of a first thread being halted, for determining if a next thread to be executed has registered a request to be allocated all or a portion of the scratchpad memory, and for initiating the saving of the contents of the scratchpad memory allocated to the first thread to a main memory location if the first thread has previously been allocated memory and if the next thread has made a request to be allocated an amount of scratchpad memory that exceeds an amount that is available to be allocated, else said kernel allocating a portion of said scratchpad memory to the second thread that does not overlap a portion already allocated to the first thread, and not initiating the saving of the contents of the portion of the scratchpad memory that is allocated to the first thread.

13. A system as in claim 12, wherein one of said scratchpad memory allocation functions is a request to allocate an amount of scratchpad memory that can not be saved to and restored from a main memory location.

14. A system as in claim 12, wherein one of said scratchpad memory allocation functions is a request to allocate an amount of scratchpad memory that can be saved to and restored from a main memory location, and further includes information specifying at least one of where to save the contents of a saved portion of said scratchpad memory or from where to restore a saved portion of said scratchpad memory from said main memory location.

15. A system as in claim 12, wherein one of said scratchpad memory allocation functions causes said kernel to set a save callback function previously registered for allocated scratchpad memory, this one of said memory allocation functions taking arguments indicating where to save or from where to restore the contents of said scratchpad memory.

16. A system as in claim 12, wherein said kernel returns information to a thread, said returned information indicating an amount of scratchpad memory allocated to said thread and a starting address of said allocated scratchpad memory.

17. A system as in claim 16, wherein said thread is sends a request to said kernel for de-allocating said allocated scratchpad memory starting at said address of said allocated scratchpad memory.

18. A system as in claim 12, wherein said kernel returns information to a thread, said returned information indicating a total size of said scratchpad memory, a size of a line in said scratchpad memory, a minimum number of lines that can be allocated, and a maximum number of lines that can be allocated as not being saved to and restored from a main memory location.

19. A system as in claim 12, wherein said special purpose processor is a vector processor, and wherein said control processor is a scalar processor.

20. A system as in claim 12, wherein said control processor is a RISC processor.

21. A data processing system, comprising:

a main memory;

a high-speed scratchpad memory;

a control processor for executing a plurality of processes; and a special purpose processor coupled to said control processor through said scratchpad memory, wherein said special purpose processor executes a subset of said plurality of processes communicated to said special purpose processor by said control processor through said scratchpad memory;

wherein if an executing one of said subset of processes is halted and a next one of said subset of processes to be executed requests an allocation of a portion of said scratchpad memory that exceeds an amount of memory that is available to be allocated from said scratchpad memory, then a portion of said scratchpad memory allocated to said halted process is saved to said main memory and said next one of said subset of processes is allocated a portion of said scratchpad memory which includes said portion of said scratchpad memory that was allocated to said halted process, else if said next one of said plurality of processes to be executed requests an allocation of a portion of said scratchpad memory that is available in said scratchpad memory, then said scratchpad memory is shared by said halted and said next one of said subset of processes.

22. A data processing system as set forth in claim 21, wherein when said halted process is re-executed said saved portion of said scratchpad memory allocated to said halted process is restored from said main memory and loaded to an available portion of said scratchpad memory.

* * * * *